(12) United States Patent
Xu

(10) Patent No.: US 10,942,544 B2
(45) Date of Patent: Mar. 9, 2021

(54) HEADSET BODY AND VIDEO GLASSES

(71) Applicant: SZ DJI TECHNOLOGY CO., LTD., Shenzhen (CN)

(72) Inventor: Zhenhua Xu, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/444,501

(22) Filed: Jun. 18, 2019

(65) Prior Publication Data

US 2019/0302836 A1 Oct. 3, 2019

Related U.S. Application Data

(63) Continuation of application No. PCT/CN2017/073744, filed on Feb. 16, 2017.

(30) Foreign Application Priority Data

Dec. 21, 2016 (CN) .......................... 201621412285.0

(51) Int. Cl.
*G09G 5/00* (2006.01)
*G06F 1/16* (2006.01)
*G02B 27/01* (2006.01)
*G06F 3/01* (2006.01)

(52) U.S. Cl.
CPC ............. *G06F 1/163* (2013.01); *G02B 27/01* (2013.01); *G06F 3/011* (2013.01); *G06F 3/012* (2013.01)

(58) Field of Classification Search
CPC .......... G06F 3/011; G06F 3/012; G06F 3/013; G02B 27/01; G02B 27/017; G02B 7/12
See application file for complete search history.

(56) References Cited

U.S. PATENT DOCUMENTS

| | | | |
|---|---|---|---|
| 9,472,025 B2* | 10/2016 | Thomas | ................. G06T 19/006 |
| 9,897,812 B2* | 2/2018 | Miller | ................. G02B 27/0176 |
| 10,448,822 B2* | 10/2019 | Alawa | ..................... A61B 3/024 |
| 2016/0216512 A1* | 7/2016 | Miller | ................. G02B 27/0176 |
| 2019/0231184 A1* | 8/2019 | Alawa | ..................... A61B 3/024 |
| 2019/0346682 A1* | 11/2019 | Kang | ................. G02B 27/0176 |
| 2019/0368656 A1* | 12/2019 | Xu | ......................... F16M 13/04 |

FOREIGN PATENT DOCUMENTS

| | | |
|---|---|---|
| CN | 201775757 U | 3/2011 |
| CN | 104503086 A | 4/2015 |
| CN | 105661735 A | 6/2016 |
| CN | 205581416 U | 9/2016 |
| CN | 106094208 A | 11/2016 |

OTHER PUBLICATIONS

World Intellectual Property Organization (WIPO) International Search Report for PCT/CN2017/073744 dated Sep. 11, 2017 6 pages

* cited by examiner

*Primary Examiner* — Vijay Shankar

(74) *Attorney, Agent, or Firm* — Anova Law Group, PLLC

(57) ABSTRACT

A headset body includes a mounting base, an adjusting base matching the mounting base, and a connecting mechanism mounted at an end of the mounting base and extending into the adjusting base. The connecting mechanism includes an elastic member configured to adjust a wearing space formed between the mounting base and the adjusting base.

18 Claims, 4 Drawing Sheets

HEADSET BODY AND VIDEO GLASSES

CROSS-REFERENCE TO RELATED APPLICATIONS

This application is a continuation of International Application No. PCT/CN2017/073744, filed on Feb. 16, 2017, which claims priority to Chinese Application No. 201621412285.0, filed on Dec. 21, 2016, the entire contents of both of which are incorporated herein by reference.

TECHNICAL FIELD

The present disclosure relates to wearable device technology and, more particularly, to a headset body and video glasses using the same.

BACKGROUND

A virtual reality (VR) head-mounted display (HMD) device is a device that integrates various technologies, such as the simulation technology, human-machine interface technology based on computer graphics, multimedia technology, sensing technology, network technology, or the like. The VR HMD device realizes a human-computer interaction manner by utilizing the computer technologies and sensing technologies.

The VR HMD device includes a headset body and a glasses body mounted on the headset body. The headset body has a hard headset structure. The headset body includes an installation space inside the headset body and some hardware is installed in the installation space to reduce a weight of the glasses body, thereby reducing pressure of the glasses body on a user's face and improving the comfortability of wearing the device. Enlarging the hardware installation space enriches and enhances the functions of the device.

In the process of wearing the headset body, a wearing space of the headset body is adjusted via an adjusting mechanism provided at the headset body to adapt to different users. However, the mating components of the adjusting mechanism for adjusting a size of the wearing space is generally rigidly connected, causing the adjustment of the adjusting mechanism to be hard. Therefore, when the size of the wearing space of the headset body is adjusted, the adjustment is inconvenient, the comfortability is poor, and the user experience is also poor.

SUMMARY

In accordance with the disclosure, there is provided a headset body including a mounting base, an adjusting base matching the mounting base, and a connecting mechanism mounted at an end of the mounting base and extending into the adjusting base. The connecting mechanism includes an elastic member configured to adjust a wearing space formed between the mounting base and the adjusting base.

Also in accordance with the disclosure, there is provided video glasses including a headset body and a video glasses body mounted at the headset body. The headset body includes a mounting base, an adjusting base matching the mounting base, and a connecting mechanism mounted at an end of the mounting base and extending into the adjusting base. The connecting mechanism includes an elastic member configured to adjust a wearing space formed between the mounting base and the adjusting base.

DESCRIPTION OF MAIN COMPONENTS AND REFERENCE NUMERALS

| | |
|---|---|
| Mounting base | 10 |
| Mounting column | 11 |
| Step portion | 111 |
| Limiting portion | 12 |
| Limiting surface | 121 |
| Guiding portion | 13 |
| Long hole | 14 |
| Adjusting base | 20 |
| Adjusting mechanism | 30 |
| Gear | 31 |
| Rotating body | 32 |
| Connecting mechanism | 40 |
| Connecting member | 41 |
| interlocking groove | 411 |
| interlocking teeth | 412 |
| Adjusting notch | 413 |
| Connecting hole | 414 |
| Guiding hole | 415 |
| Reinforcing portion | 416 |
| Elastic member | 42 |
| Glasses body | 50 |

DETAILED DESCRIPTION OF THE EMBODIMENTS

Example embodiments of the present disclosure will be described with reference to the drawings. Unless otherwise defined, the same numbers in different drawings represent the same or similar elements. The example embodiments do not include all of the embodiments consistent with the present disclosure, but are merely examples of apparatuses and methods consistent with some aspects of the present disclosure.

The terms in the specification, claims, and the drawings of the present disclosure are merely used to illustrate embodiments of the present disclosure, instead of limiting the present disclosure. Unless otherwise defined, the terms "one," "a," "the," or the like are meant to encompass "multiple," "a plurality of," or the like. The term "and/or" used herein includes any suitable combination of one or more related items listed.

The terms "first," "second," "third," or the like in the specification, claims, and the drawings of the present disclosure are merely used to describe various information, and are not intended to limit the information. These terms are merely used to distinguish the same type of information. For example, first information may also be referred to as second information without departing from the scope of the present disclosure, and similarly, the second information may also be referred to as the first information. Depending on the context, the word "if" as used herein may be interpreted as "when," "while," or "in response to."

Figure 1:
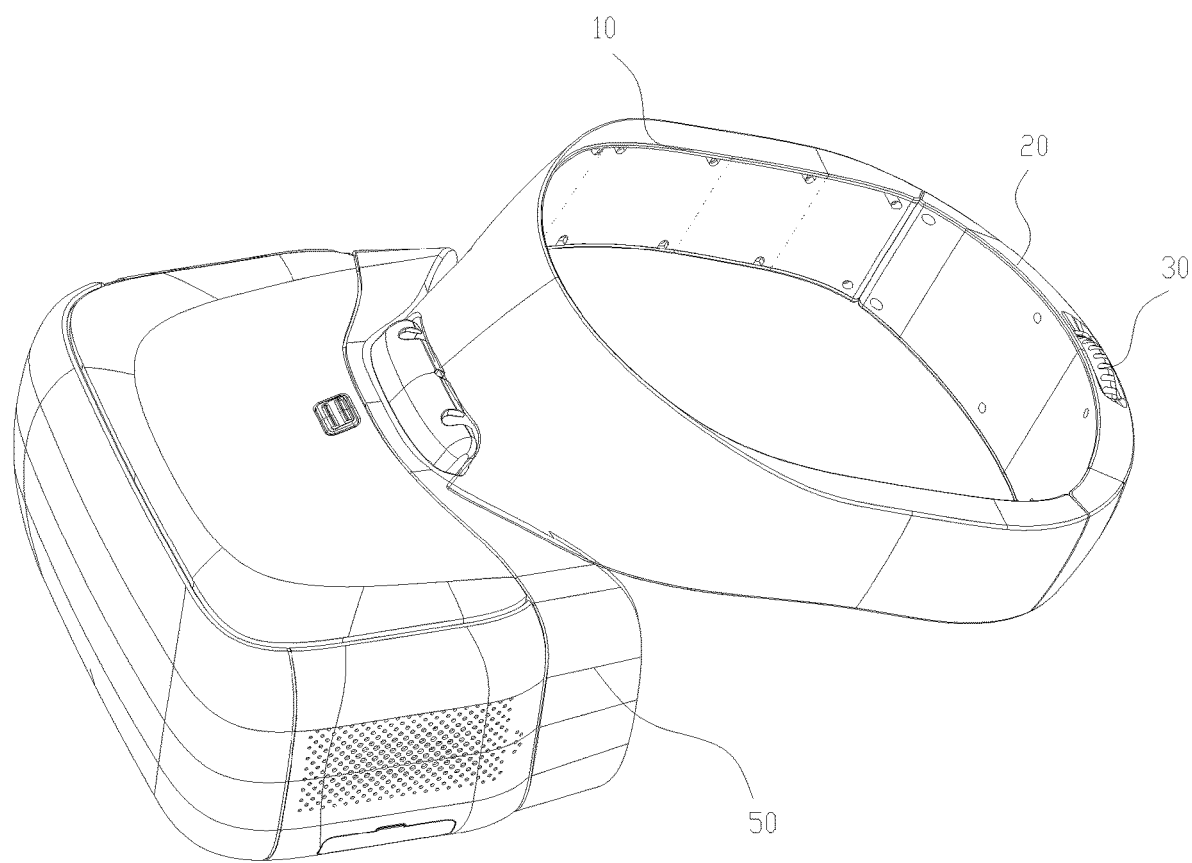
FIG. 1 is a schematic structure diagram of video glasses according to the disclosure.
Figure 2:
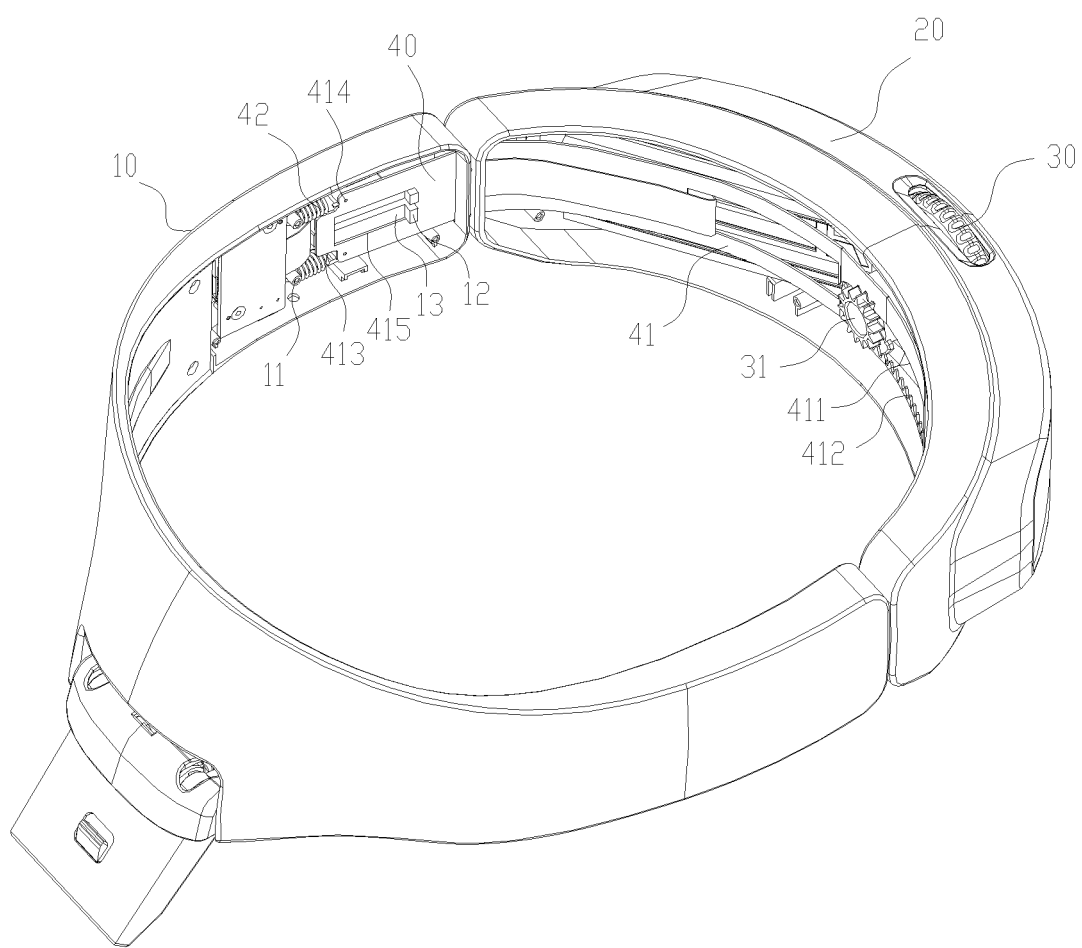
FIG. 2 is a schematic structure diagram of a headset body according to the disclosure.

FIG. 1 is a schematic structure diagram of video glasses consistent with the disclosure. FIG. 2 is a schematic structure diagram of a headset body consistent with the disclosure. As shown in FIGS. 1 and 2, the video glasses include a headset body and a glasses body 50 mounted at the headset body. The headset body includes a mounting base 10, an adjusting base 20, and two connecting mechanisms 40. The adjusting base 20 can cooperate with the mounting base 10. The connecting mechanisms 40 are mounted at two ends of the mounting base 10, respectively, and extend into the adjusting base 20. The adjusting base 20 and the mounting base 10 are connected by the connecting mechanisms 40 to form a wearing space. In some embodiments, the wearing space has a closed and approximately circular shape. The connecting mechanism 40 is provided with at least one elastic member 42. The elastic member 42 can be configured to enlarge the wearing space.

The glasses body 50 is mounted at the mounting base 10. The connecting mechanism 40 is mounted at the two ends of the mounting base 10 and is connected to two ends of the adjusting base 20 to form the headset body having an annular structure. The connecting mechanism 40 includes at least one elastic member 42. The elastic member 42 can be elastically deformed. The elastic member 42 can be elongated under a pulling force. After the pulling force is removed, the elastic member 42 can be contracted and restored under its own elastic force. The adjusting base 20 can pull the connecting mechanism 40 and overcome the elastic force of the elastic member 42, such that the wearing space between the adjusting base 20 and the mounting base 10 can be enlarged for a user to wear. In the headset body having the hard headset structure, the connecting mechanism 40 is configured to partially have elastic deformation properties. The connecting mechanism 40 rigidly connected to the adjustment base 20 are configured to be elastically enlarged and contracted, thereby providing a more comfortable manner for wearing the video glasses.

When the user uses the video glasses, the adjusting base 20 can be pulled to deform the elastic member 42 and hence to enlarge the wearing space. When the user is wearing the video glasses on his head, the glasses body 50 can be attached to the user's face. After the adjusting base 20 is loosened, the adjusting base 20 can be tightly attached to the user's head under the effect of the elastic force. As such, the video glasses can be easy to wear, the comfortability can be good, and the user experience can also be good.

As shown in FIG. 2, each connecting mechanism 40 also includes a connecting member 41. The connecting member 41 has a flat structure. An end of the connecting member 41 is connected to the mounting base 10 via at least one elastic member 42 and the other end of the connecting member 41 extends into the adjusting base 20. An adjusting mechanism 30 is mounted at the adjusting base 20. The adjusting mechanism 30 is connected to the two connecting members 41 extending into the adjusting base 20. The adjusting mechanism 30 can drive the two connecting members 41 to move, and hence the adjusting base 20 can move to enlarge or reduce the wearing space.

A cover plate is provided at the mounting base 10, and the cover plate can seal the connecting mechanisms 40 inside the mounting base 10. The two connecting members 41 can extend from the two ends of the mounting base 10 into the adjusting base 20. The adjusting mechanism 30 is connected to the two connecting members 41 and locks positions of the two connecting members 41. The adjusting mechanism 30 can drive the two connecting members 41 to move by rotating or moving. The movement of the two connecting members 41 can change a length of the two connecting members 41 arranged between the adjusting base 20 and the mounting base 10, and can further adjust the size of the wearing space between the mounting base 10 and the adjusting base 20. The adjustment can be easy.

When the user is wearing the video glasses, if the elastic force generated by the elastic member 42 is insufficient to support the video glasses to be comfortably worn on the user's head, the adjusting mechanism 30 provided at the adjusting base 20 needs to be further adjusted. The adjusting mechanism 30 can drive the two connecting members 41 to move and can lock the two connecting members 41, such that the adjusting base 20 can move to reduce the wearing space. After the adjusting mechanism 30 completes the adjustment of the size of the wearing space, the user can comfortably wear the video glasses under the elastic force of the connecting mechanisms 40, and the user experience can be good.

Figure 5:
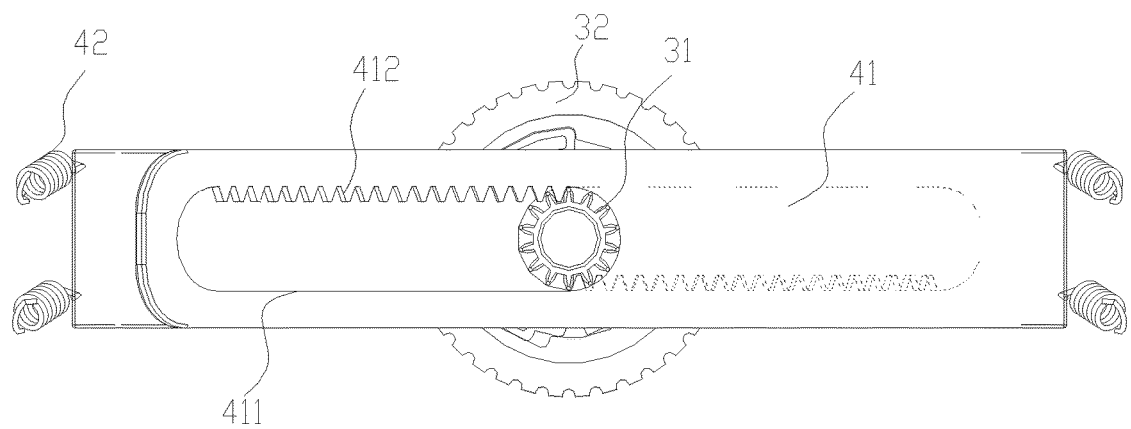
FIG. 5 schematically shows a connecting structure of an adjusting mechanism and two connecting members according to the disclosure.

FIG. 5 schematically shows a connecting structure of the adjusting mechanism 30 and two connecting members 41 consistent with the disclosure. As shown in FIGS. 2 and 5, the adjusting mechanism 30 includes a gear 31. The gear 31 is mounted at the adjusting base 20. Each connecting member 41 includes an interlocking groove 411. The interlocking groove 411 includes interlocking teeth 412 engaging with the gear 31. The interlocking teeth 412 are arranged inside the interlocking groove 411. The two connecting members 41 can be inserted in the adjusting base 20, and can cause the interlocking teeth 412 to engage with the gear 31. The gear 31 is arranged at a rotating body 32 that is concentric with the gear 31. The rotating body 32 is mounted at the adjusting base 20, and an outer edge of the rotating body 32 partially protrudes from the adjusting base 20. The rotating body 32 can rotate to cause the gear 31 to drive the two connecting members 41 to contract from or extend toward two sides with respect to a center of the gear 31.

The gear 31 can rotate to drive the two connecting members 41 to move via an engaging connection between the gear 31 and the interlocking groove 411 on each connecting member 41. After the gear 31 stops to rotate, the gear 31 can be locked at the adjusting base 20 and the two connecting members 41 can be locked at an engaged position. The adjusting base 20 can be moved under the driving of the two connecting members 41 to adjust the size of the wearing space and the adjustment can be more convenient.

When the two connecting members 41 are inserted in the adjusting base 20 from the two ends of the adjusting base 20, the two connecting members 41 can intersect inside the adjusting base 20 and the interlocking grooves 411 of the two connecting members 41 partially overlap. As a result, the gear 31 can engage with the interlocking teeth 412 of the two connecting members 41 at the same time. Because the gear 31 can engage with the two connecting members 41 at the same time, the gear 31 can drive the two connecting members 41 to move at the same time, such that amounts of expansion or contraction at the two ends of the adjusting base 20 can be consistent, and the movement of the adjusting base 20 can be stable.

Figure 3:
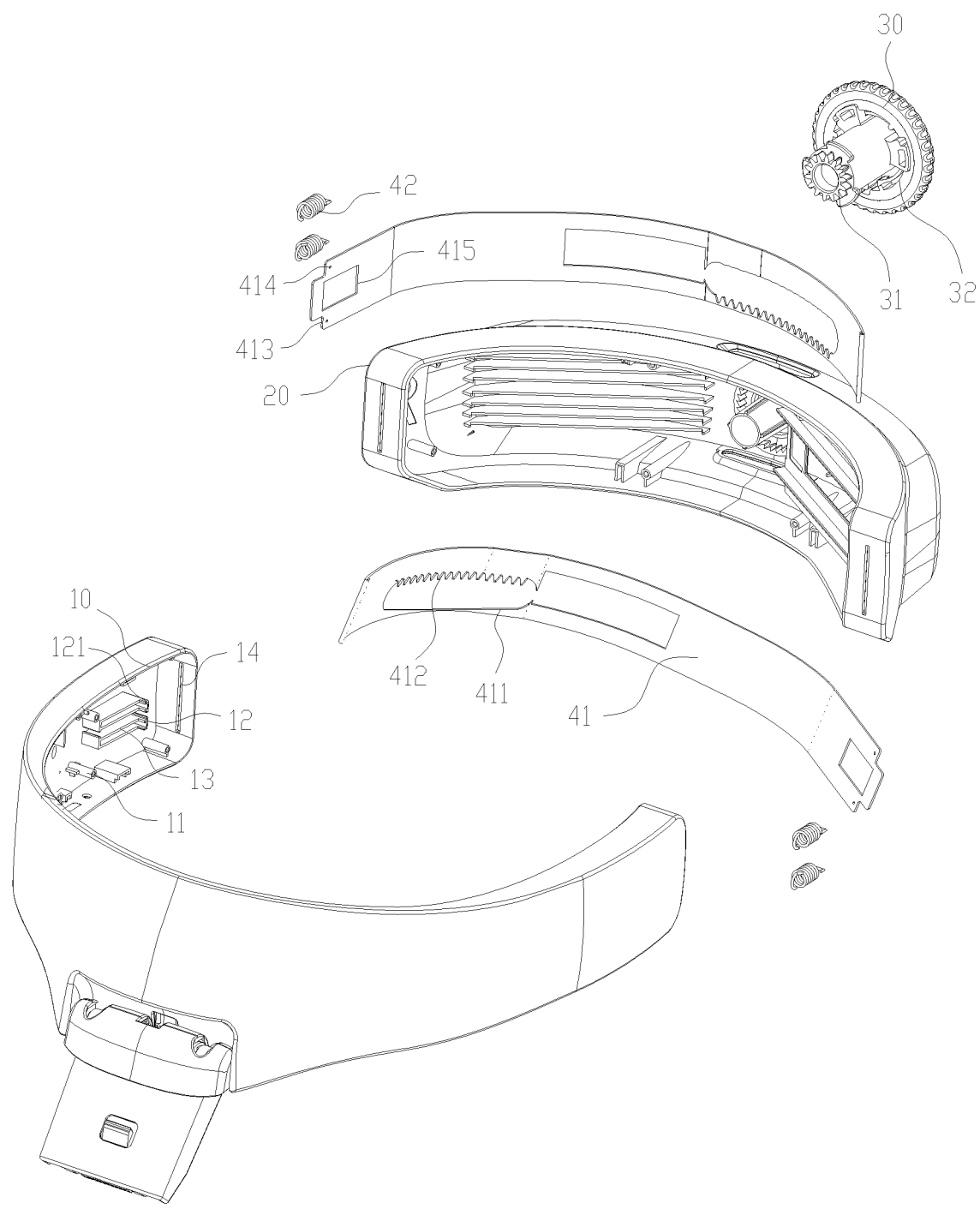
FIG. 3 is an exploded view of the headset body according to the disclosure.
Figure 4:
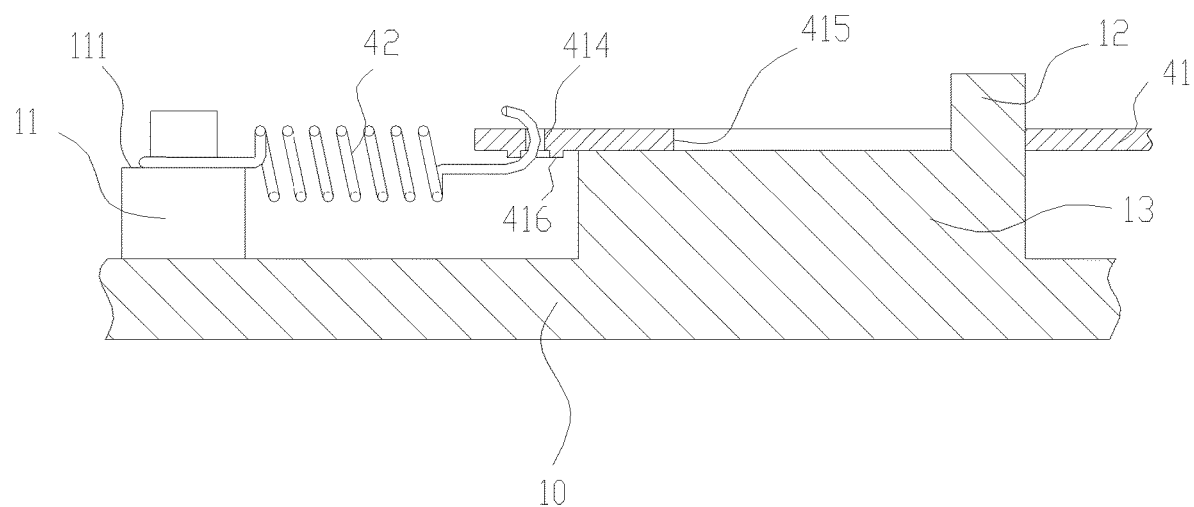
FIG. 4 is an enlarged schematic view of a connection between a connecting member and an elastic member according to the disclosure.

FIG. 3 is an exploded view of the headset body consistent with the disclosure. FIG. 4 is an enlarged schematic view of a connection between each connecting member 41 and the elastic member 42.

As shown in FIGS. 3 and 4, each connecting member 41 includes an adjusting notch 413 corresponding to the elastic member 42. The elastic member 42 extends to the adjusting notch 413 and is connected to the corresponding connecting member 41. The adjusting notch 413 is formed at an end of each connecting member 41 that is arranged inside the mounting base 10. The elastic member 42 extends to the adjusting notch 413 and is connected to an edge of the corresponding adjusting notch 413, such that an installation length of the elastic member 42 in a limited space inside the mounting base 10 can become longer, thereby improving a deformation amount of the elastic members 42 and the space utilization of the mounting base 10. The structure is ingenious.

Each connecting member 41 includes a connecting hole 414. An end of the elastic member 42 is connected to the connecting hole 414. Each connecting member 41 includes a protruding reinforcing portion 416, and the connecting hole 414 is arranged at the reinforcing portion 416. The elastic member 42 can pass through the connecting hole 414 to be connected to the corresponding connecting member 41 and the installation can be easy. The reinforcing portion 416 can be a boss or a rib that is provided at a surface of the corresponding connecting member 41. The connecting hole 414 can be arranged at the reinforcing portion 416 to increase a strength of a force-receiving portion of each connecting member 41, such that each connecting member 41 has a small deformation and a high strength when receiving the elastic force.

A connecting structure between the elastic member 42 and the mounted base 10 is shown in FIGS. 3 and 4.

The mounting base 10 includes a mounting column 11 cooperating with the elastic member 42. The elastic member 42 is mounted at the mounting column 11. The mounting column 11 includes a step portion 111. The step portion 111 protrudes from an outer surface of the mounting column 11 and intersects with an inner surface of the mounting base 10, and the elastic member 42 is mounted at the mounting column 11 and is limited by the step portion 111. The step portion 111 can adjust a position and a height of the elastic member 42 mounted at the mounting column 11, such that the elastic member 42 can cooperate with the movement of the corresponding connecting member 41. Each connecting member 41 receives the elastic force parallel to a moving direction of the connecting member 41, such that the two connecting members 41 can move smoothly and the force can be uniform.

In some embodiments, as shown in FIGS. 3 and 4, at least one elastic member 42 includes two elastic members 42. Two adjusting notches 413 are symmetrically opened at each connecting member 41. The two elastic members 42 are symmetrically arranged with respect to each other about a center line of the connecting member 41 and are connected to the connecting member 41. That is, the two elastic members 42 respectively extend to the two adjusting notches 413 and are attached to the two connecting holes 414 of the corresponding connecting member 41. Two mounting columns 11 are arranged at each end of the mounting base 10. The two elastic members 42 are mounted at the two mounting columns 11. Because the two symmetrically arranged elastic members 42 are connected to the connecting member 41, the corresponding connecting member 41 can be subjected to a uniform force and can have a good stability. Each elastic member 42 can include one of a tension spring or an elastic stretch band.

A limiting structure between each connecting member 41 and the mounting base 10 is shown in FIGS. 2 to 4.

The mounting base 10 includes two limiting portions 12. Each connecting member 41 includes a guiding hole 415 cooperating with the corresponding limiting portion 12, and the corresponding limiting portion 12 passes through the guiding hole 415. The mounting base 10 is opened with two long holes 14 through which the two connecting members 41 can protrude out of the mounting base 10. An end of each connecting member 41 is connected to the corresponding elastic member 42 and the other end of each connecting member 41 protrudes from the corresponding long hole 14. Each limiting portion 12 protrudes from an inner surface of the mounting base 10, and each connecting member 41 penetrates the corresponding long hole 14, and each limiting portion 12 penetrates the corresponding guiding hole 415 and is perpendicular to the moving direction of the corresponding connecting member 41. The guiding hole 415 can be a slot-shape hole, such as an obround-shape hole, a rectangular-shape hole, or the like. Each limiting portion 12 includes two limiting surfaces 121 on both sides of the limiting portion 12, and a distance between the two limiting surfaces 121 is slightly smaller than a width of the corresponding guiding hole 415.

The limiting portions 12 are included inside the mounting base 10 to limit an extending range of the two connecting members 41 to control an extending length of the elastic members 42 and to protect the reliability of the use of the connecting mechanisms 40. As such, damage to the elastic members 42 or the connecting members 41 due to an excessive pulling of the adjusting base 20 and the effect on the use of the headset body can be avoided. The limiting surfaces 121 are included in the limiting portions 12, such that the connecting members 41 can slide smoothly during the sliding process and the swing of the sliding can be small.

The mounting base 10 includes two guiding portions 13 and a height of each guiding portion 13 is smaller than a height of the corresponding limiting portion 12. Each connecting member 41 abuts against the corresponding guiding portion 13, and the guiding portion 13 extends in the moving direction of the corresponding connecting member 41. In some embodiments, each limiting portion 12 can be formed at an end of the corresponding guiding portion 13 in an extending direction of the corresponding elastic member 42.

A total length of each guiding portion 13 and the corresponding limiting portion 12 is greater than a length of the corresponding guiding hole 415. When the adjusting base 20 pulls the two connecting members 41 to move, each connecting member 41 can move along the corresponding guiding portion 13, and an edge of each guiding hole 415 is always on a surface of the corresponding guiding portion 13, such that the two connecting members 41 can move smoothly. The guiding portions 13 can also be arranged to adjust heights of the two connecting members 41 to match positions of the two long holes 14 of the mounting base 10, such that the frictional force exerted on the two connecting members 41 can be small, and the two connecting members 41 can be extended from or retracted to the mounting base 10 smoothly. Each step portion 111 of the mounting base 10 can cooperate with the corresponding guiding portion 13. When a direction of the elastic force of each elastic member 42 is parallel to the corresponding guiding portion 13, the friction force received by the connecting member 41 when being extended or contracted can be reduced. When the direction of the elastic force of each elastic member 42 obliquely intersects the corresponding guiding portion 13, the corresponding connecting member 41 can be attached to the corresponding guiding portion 13 when being extended, such that the two connecting members 41 can move smoothly.

In the situation of no conflict, the embodiments and features of the embodiments can be combined.

It is intended that the embodiments be considered as examples only and not to limit the scope of the disclosure. Those skilled in the art will be appreciated that any modification or equivalents to the disclosed embodiments are intended to be encompassed within the scope of the present disclosure.

What is claimed is:

1. Video glasses comprising:
   a headset body including:
      a mounting base;
      an adjusting base matching the mounting base; and
      a connecting mechanism including:
         an elastic member; and
         a connecting member, a first end of the connecting member being connected to the mounting base via the elastic member, and a second end of the connecting member extending into the adjusting base and being accommodated by the adjusting base, wherein a movement of the second end inside the adjusting base enables a deformation of the elastic member to change a length of a part of the connecting member that is located between the mounting base and the adjusting base for adjusting a wearing space of the headset body; and
   a video glasses body mounted at the headset body.

2. The video glasses of claim 1, wherein:
   the connecting member includes an adjusting notch corresponding to the elastic member; and
   the elastic member extends to the adjusting notch and is connected to the connecting member.

3. The video glasses of claim 1, wherein:
   the connecting member includes a connecting hole; and
   the elastic member is connected to the connecting member at the connecting hole.

4. The video glasses of claim 3, wherein:
   the connecting member includes a reinforcing portion protruding from a surface of the connecting member; and
   the connecting hole is arranged at the reinforcing portion.

5. The video glasses of claim 1, wherein:
   the elastic member is a first elastic member;
   the connecting mechanism further includes a second elastic member connected to the connecting member; and
   the first elastic member and the second elastic member are arranged symmetrically to each other about a center line of the connecting member.

6. The video glasses of claim 1, wherein:
   the mounting base includes a limiting portion;
   the connecting member includes a guiding hole; and
   the limiting portion passes through the guiding hole.

7. The video glasses of claim 1, wherein:
   the mounting base includes a mounting column; and
   the elastic member is mounted at the mounting column.

8. The video glasses of claim 5, wherein:
   the mounting column includes a step portion; and
   the elastic member is limited by the step portion.

9. The video glasses of claim 1, wherein:
   the elastic member includes a tension spring or an elastic stretch band.

10. A headset body comprising:
    a mounting base;
    an adjusting base matching the mounting base; and
    a connecting mechanism including:
       an elastic member; and
       a connecting member, a first end of the connecting member being connected to the mounting base via the elastic member, and a second end of the connecting member extending into the adjusting base and being accommodated by the adjusting base,
    wherein:
       a movement of the second end inside the adjusting base enables a deformation of the elastic member to change a length of a part of the connecting member that is located between the mounting base and the adjusting base for adjusting a wearing space of the headset body.

11. The headset body of claim 10, wherein:
    the connecting member includes an adjusting notch corresponding to the elastic member; and
    the elastic member extends to the adjusting notch and is connected to the connecting member.

12. The headset body of claim 10, wherein:
    the connecting member includes a connecting hole; and
    the elastic member is connected to the connecting member at the connecting hole.

13. The headset body of claim 12, wherein:
    the connecting member includes a reinforcing portion protruding from a surface of the connecting member; and
    the connecting hole is arranged at the reinforcing portion.

14. The headset body of claim 10, wherein:
    the elastic member is a first elastic member;
    the connecting mechanism further includes a second elastic member connected to the connecting member; and
    the first elastic member and the second elastic member are arranged symmetrically to each other about a center line of the connecting member.

15. The headset body of claim 10, wherein:
    the mounting base includes a limiting portion;
    the connecting member includes a guiding hole; and
    the limiting portion passes through the guiding hole.

16. The headset body of claim 10, wherein:
    the mounting base includes a mounting column; and
    the elastic member is mounted at the mounting column.

17. The headset body of claim 16, wherein:
    the mounting column includes a step portion; and
    the elastic member is limited by the step portion.

18. The headset body of claim 10, wherein the elastic member includes a tension spring or an elastic stretch band.

* * * * *